(12) United States Patent
Geber et al.

(10) Patent No.: US 6,963,794 B2
(45) Date of Patent: Nov. 8, 2005

(54) LOCKING SYSTEM FOR A MOTOR VEHICLE

(75) Inventors: Michael Geber, Bad Urach (DE); Uwe Hipp, Inzigkofen-Engelwies (DE); Johannes Mattes, Friedingen (DE); Karl Mueller, Rottweil-Neufra (DE); Andreas Pohlmann, Weil der Stadt (DE); Matthias Reinhardt, Sindelfingen (DE); Markus Ruther, Ostfildern (DE); Dietmar Weisser, Tuttlingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/895,986

(22) Filed: Jul. 22, 2004

(65) Prior Publication Data

US 2005/0033484 A1 Feb. 10, 2005

Related U.S. Application Data

(63) Continuation of application No. PCT/EP03/00486, filed on Jan. 20, 2003.

(30) Foreign Application Priority Data

Jan. 23, 2002 (DE) ............................... 102 02 332

(51) Int. Cl.[7] ........................... G05D 1/00; G06F 17/00; B60R 25/10; B60R 25/04; H04Q 5/22
(52) U.S. Cl. .................. 701/2; 701/36; 340/426.13; 340/426.17; 340/426.36; 340/10.1; 340/10.33; 340/10.34; 340/5.6; 307/10.5
(58) Field of Search .................. 701/2, 36; 307/10.1, 307/10.2, 10.3, 10.5, 10.6, 10.7; 340/426.13, 340/426.17, 426.36, 539.3, 10.1, 10.33, 10.34, 340/5.6

(56) References Cited

U.S. PATENT DOCUMENTS

| 4,942,393 A | * | 7/1990 | Waraksa et al. ........... 340/5.62 |
|---|---|---|---|
| 5,798,576 A | * | 8/1998 | Ostermann et al. ........ 307/10.3 |
| 5,838,257 A | * | 11/1998 | Lambropoulos ........... 340/5.61 |
| 5,973,611 A | * | 10/1999 | Kulha et al. ................ 340/5.62 |
| 6,037,675 A | | 3/2000 | Yoshida et al. |
| RE38,338 E | * | 12/2003 | Yoshida et al. ............ 307/10.2 |
| 6,664,899 B1 | * | 12/2003 | Tsuchihashi ........... 340/825.69 |
| 6,670,883 B1 | * | 12/2003 | Asakura et al. ............ 340/5.61 |

FOREIGN PATENT DOCUMENTS

| DE | 43 40 260 A1 | 11/1993 |
|---|---|---|
| DE | 197 25 667 A1 | 6/1997 |
| DE | 197 56 341 A1 | 12/1997 |

(Continued)

*Primary Examiner*—Thomas G. Black
*Assistant Examiner*—Brian J. Broadhead
(74) *Attorney, Agent, or Firm*—Crowell & Moring LLP

(57) ABSTRACT

A system for automatic access or driving authorization for a motor vehicle includes a first device in the form of a control device having at least two states for engaging and disengaging vehicle door locks, an immobilizer, or the like. An associated second device is provided in the form of an electronic key, an ID transmitter, a chip card or the like. Both devices have means for transmitting or receiving signals, including a coded operating signal for authenticating the second device, so that a change in the state of the first device can be implemented when the second device is authorized. Before the second device is first activated, it is in a sleep state in which operation-independent function is not permitted and energy consumption is reduced. During a first operator-dependent authentication, the second device is changed over from the sleep state into a standby state in which an operation-independent function is at least partially made possible.

8 Claims, 4 Drawing Sheets

FOREIGN PATENT DOCUMENTS

| | | |
|---|---|---|
| DE | 199 12 319 C1 | 3/1999 |
| EP | 0 492 692 A2 | 12/1991 |
| EP | 0 571 718 A2 | 3/1993 |
| EP | 1 046 558 A1 | 1/1999 |
| EP | 1 081 898 A2 | 3/2001 |
| EP | 1 127 757 A2 | 8/2001 |
| EP | 1128007 A2 * | 8/2001 ........... E05B 49/00 |
| WO | WO 93/25987 | 12/1993 |

* cited by examiner

LOCKING SYSTEM FOR A MOTOR VEHICLE

CROSS-REFERENCE TO RELATED APPLICATIONS

This application is a continuation of PCT Application No. PCT/EP03/00486 filed on 20 Jan. 2003, which claims the priority to German patent document 102 02 332.8, filed 23 Jan. 2002.

BACKGROUND AND SUMMARY OF THE INVENTION

The invention relates to an electronic locking system for a vehicle.

To accommodate increased security requirements, electronic locking systems are used, which operate, for example, by means of electromagnetic waves. In particular in motor vehicles, such locking systems are used for door locking, access authorization and/or ignition locking, steering wheel locking, and immobilizers or the like for driving authorization.

Such a locking system is disclosed, for example, in German patent document DE 43 40 260 A1, in which a control device that has at least two states is provided for unlocking and/or locking the car doors, the ignition lock or the like, and a second device is provided in the form of an electronic key. The two devices have means for transmitting and/or receiving signals, whereby at least one signal can be means for transmitting and/or receiving signals, whereby at least one signal can be transmitted between the key and the control device as a coded operating signal for authenticating the key, to change the state of the control device after the transmitted operating signal has been evaluated, and thus when the key is authorized.

Such locking systems which are operated manually have also been further developed as so-called "keyless" functions, for which it is no longer necessary for the user to activate the electronic key manually. Rather, it is sufficient for the user to carry the key on his person. The operating signal is then transmitted automatically for access authorization between the two devices if the user is located in an active region in the vicinity of the motor vehicle, and (for example in "keyless entry" systems) activates the door handle on the car door there. Likewise, these locking systems may have a "keyless go" function, in which the operating signal for driving authorization is transmitted automatically between the two devices if the user is located within the motor vehicle and, for example, activates a start/stop pushbutton key on the dashboard.

In order to provide such keyless functions, the key is continuously in the standby state, and thus continuously consumes energy, even in the case of a new key which has not been used at all. When a key is in storage, for example before the motor vehicle is delivered, or also when the key is a spare key, this can prematurely exhaust the battery located in the key. In an extreme case, the key may even no longer be operable when it is delivered to the user.

European patent document EP 1 127 757 A2 describes a locking system, in particular for automatic access authorization, a keyless entry/go function, manually actuated access authorization and/or driving authorization for a motor vehicle. A control device, which has at least two states, is provided for unlocking and/or locking car doors, the ignition lock, the steering wheel locking means, or for enabling and/or disabling the immobilizer, the engine control unit or the like, in conjunction with a second device, such as an electronic key, an ID transmitter, chip card or the like. Means are provided for transmitting and/or receiving signals, between the control device and the second device, including in particular a coded operating signal for authenticating the second device. After positive evaluation of the operating signal, a change in the state of the first device can be brought about when the second device is authorized.

In the locking system disclosed in German patent document DE 43 40 260 A1, an electronic ignition lock for the manual driving authorization is arranged in the motor vehicle. The ignition lock has a receptacle into which the second device is inserted by the user for manual authentication.

One object of the invention is to provide locking system with a "keyless" function, in which the consumption of energy before the key is delivered is reduced.

This and other objects and advantages are achieved by the locking system according to the invention, in which, before its initial activation the second device (a key) is in a sleep state such that automatic operation is not possible, and energy consumption is reduced. During the first manual authentication (that is, during the initial authentication), the second device is changed over from the sleep state into a standby state in which automatic operation is at least partially possible.

According to a feature of the invention, the ignition lock is also in the initial authentication, for changing over the second device from the sleep state into the standby state. For this purpose, the initial authentication in the ignition lock is carried out after the key which is used as the second device has been plugged into the receptacle. Advantageously, this can be carried out by the user himself, so that the energy saving continues until the key is actually used. Furthermore, the initial activation of the key can also be carried out without additional devices, and consequently without additional costs.

In one embodiment of the invention, the second device is completely switched-off in the sleep state. As a result, the second device consumes essentially no energy before the initial activation. The second device is expediently in the sleep state while it is being manufactured and in particular while it is being delivered to the user. As a result, the second device itself is still in the "new" condition, even when it has been stored a long time before being delivered.

The invention makes it possible to save energy for the second device until it is used, including, for example, when the device is still in storage. As a result, the service life of the battery in the second device is prolonged. If the second device is a spare key, it is possible to advantageously prevent a situation in which the battery of the key becomes prematurely exhausted and the key is not ready for use in an emergency situation.

Other objects, advantages and novel features of the present invention will become apparent from the following detailed description of the invention when considered in conjunction with the accompanying drawings.

DETAILED DESCRIPTION OF THE DRAWINGS

Figure 1:
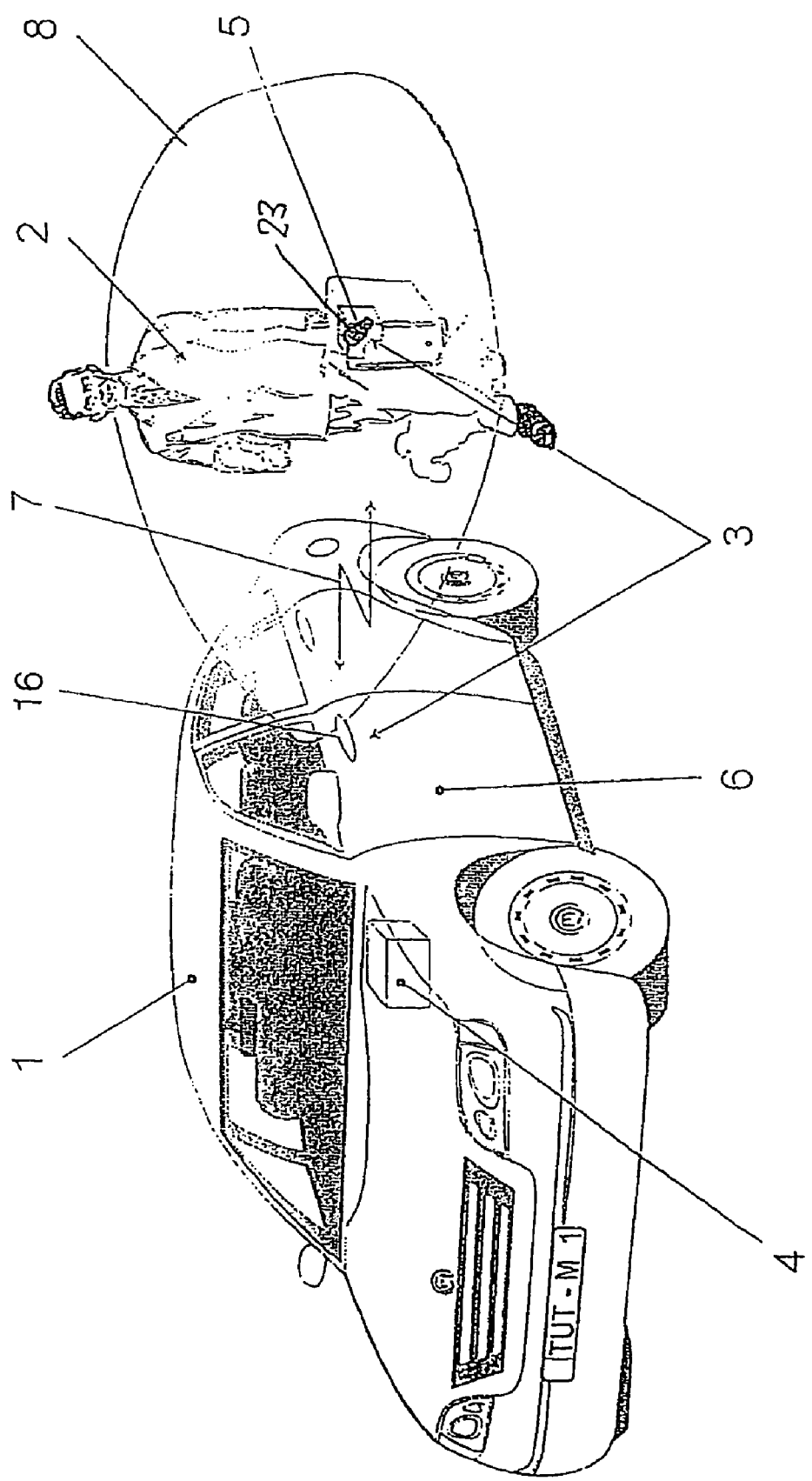
FIG. 1 shows a motor vehicle which is equipped with a locking system.

FIG. 1 shows an authorized user 2 adjacent a motor vehicle 1 which has a door locking system 3 comprising a first device 4 in the form of a control device, and an associated second device 5 in the form of an electronic key, an identification (ID) transmitter, a chip card, a smart card or the like for access authorization. Because the second device 5 is in the possession of the authorized user 2, he or she has operator-independent access to the motor vehicle 1 within an active region 8.

The first device 4 has at least two states, the car doors 6 (for example) being locked in the first state and unlocked in the second state. The two devices 4, 5 include means for transmitting and/or receiving between them signals 7, at least one of which is a coded, electromagnetic operating signal 15. (See FIG. 3.) The coded operating signal 15 is used to authenticate the second device 5, so that after positive evaluation of the operating signal 15, a change in the state of the first device 4 can be brought about when the second device 5 is authorized.

The coded operating signal 15 is transmitted when the authorized user 2 activates the door handle 16 on the car doors 6 or approaches the door handle 16. As a result, unlocking of the car doors 6 is triggered in accordance with the keyless entry function. Likewise, the coded operating signal 15 can also be transmitted automatically without the intervention of the user 2 as soon as the latter enters the active region 8, but this is not considered in more detail below. If the user closes the car doors 6 from the outside, the car doors 6 are locked automatically. Likewise, the car doors 6 can be locked automatically after the user has left the active region 8.

Figure 2:
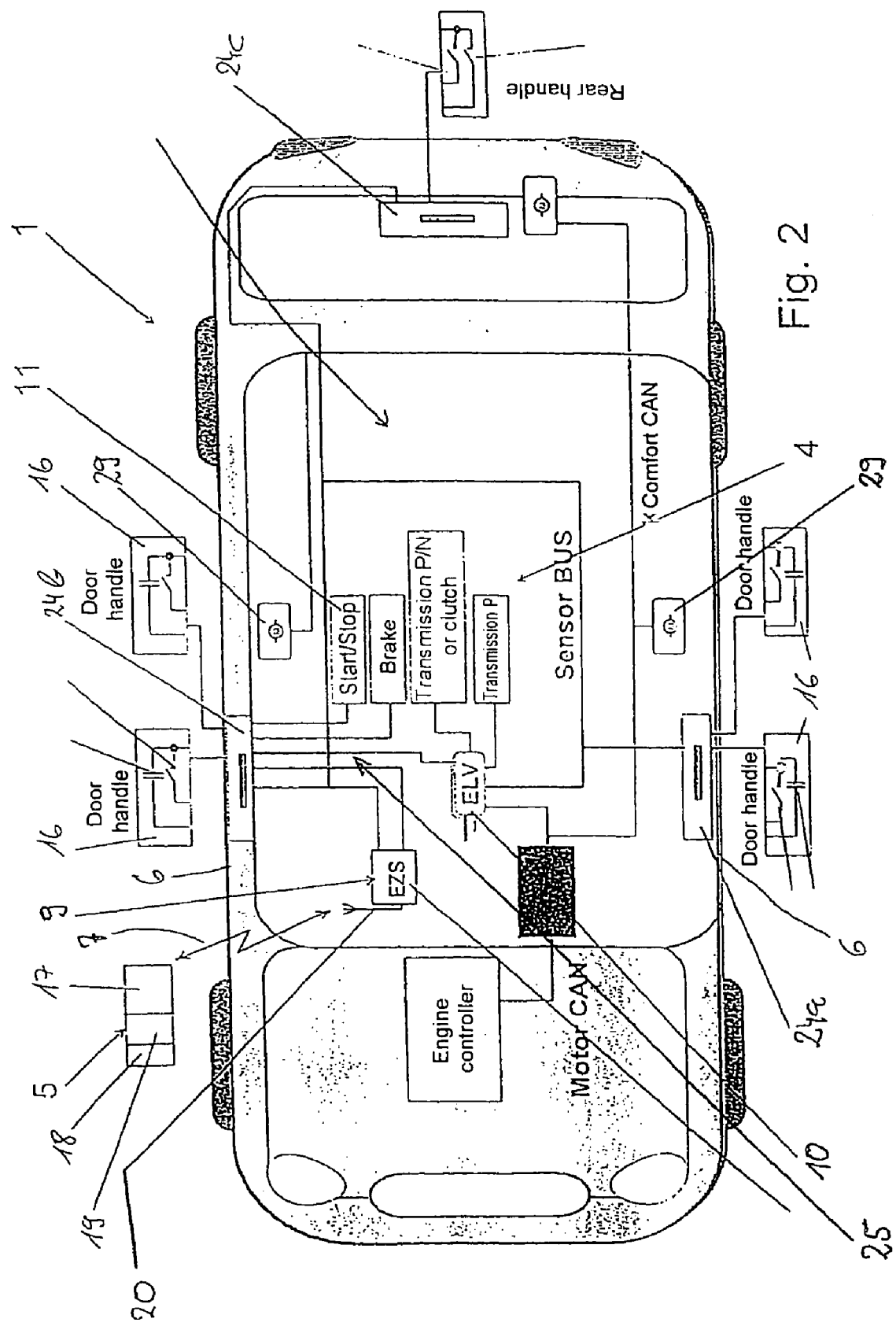
FIG. 2 is a schematic diagram of the locking system with automatic functions.

The locking system 3 also detects the driving authorization for the motor vehicle 1 independently of any manipulation of the second device 5. For this purpose, the first device 4, which is embodied as a control device, also brings about the unlocking and/or locking of the ignition lock 9 or of the steering wheel locking means 10, which is shown in FIG. 2, in accordance with the two states. Likewise, another functionally relevant component of the motor vehicle 1 can be correspondingly activated by means of the first device 4. For example, it is possible to enable and/or disable an immobilizer, the engine control unit or the like.

For authentication of the second device 5, the coded operating signal 15 is transmitted when the authorized user 2 is located in the motor vehicle 1 and activates a start/stop switch 11. As a result, the starting process (or the like) of the motor vehicle 1 is triggered in accordance with the keyless go function.

The automatic method of operation of the locking system 3 according to the invention will now be explained in more detail with reference to FIG. 3. At first, the first device 4 transmits an electromagnetic signal 12, designated as a wake-up Signal, for the associated second device 5. As a result, the second device 5 is changed over from a standby state with reduced energy consumption into an activated state for intended operation. After this, the first device 4 transmits at least one further electromagnetic signal 13 (referred to below as a region delimiting signal), so that the associated second device 5 can determine its location with respect to the first device 4. In particular it is possible to detect whether the second device 5 is located outside of the motor vehicle 1 and, if appropriate, at what location and/or in the motor vehicle 1. The second device 5 subsequently transmits a further signal 14, referred to below as a response signal, containing information relating to the determined location, to the first device 4. Finally, as already described, the coded electromagnetic operating signal 15 is transmitted between the first and the second device 4, 5 for authentication purposes. The signal 15 can be composed in particular of a plurality of component signals, and transmitted in a bidirectional communication between the two devices 4, 5 in a known manner. Reference is made to German patent document DE 43 40 260 A1 for more details on the bidirectional communication itself.

Figure 3:
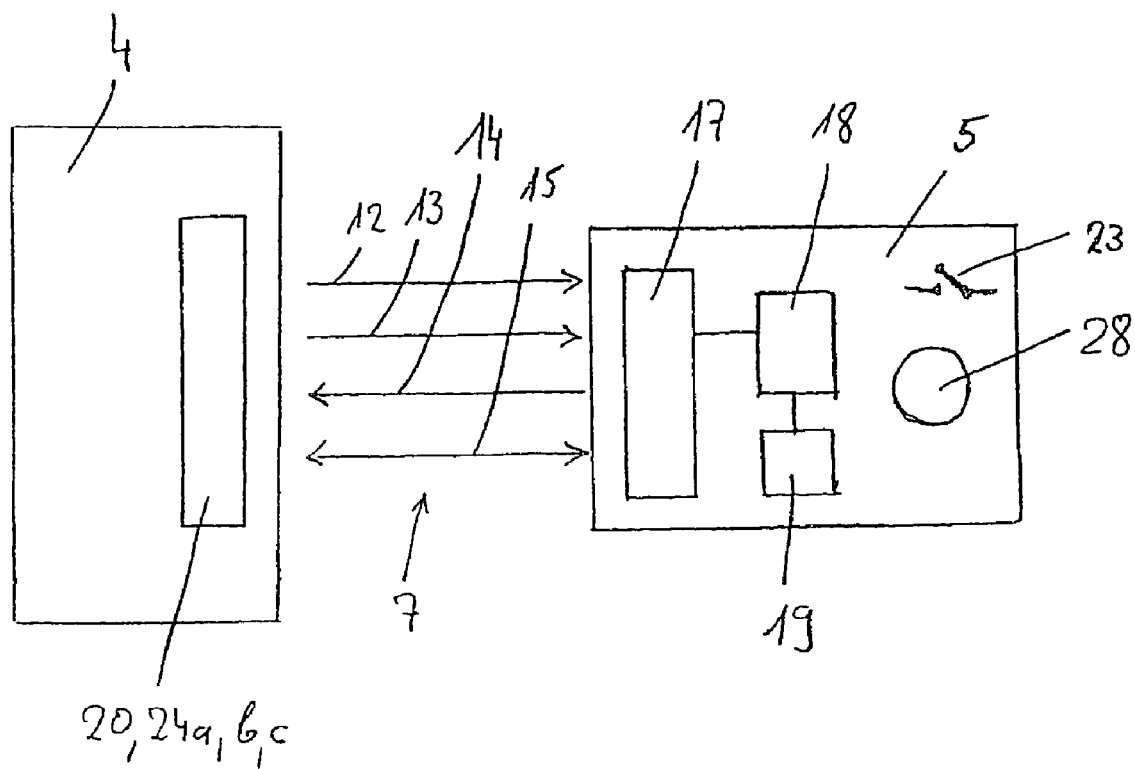
FIG. 3 shows a schematic block circuit diagram of the ID transmitter with a diagram for transmitting the signals.

The second device 5, which is also shown in FIG. 3 as a schematic block diagram, has a transmitter/receiver 17 and a logic circuit 18 which is composed, for example, of a microcomputer. In order to supply energy to the transmitter/receiver 17 and to the logic circuit 18, an energy accumulator 28 (for example a battery) is located in the second device. The first device 4 contains, for example, two transmitters 24a, 24b as can be seen in FIG. 2. In each case one of these transmitters 24a, 24b is arranged in the door region of the motor vehicle 1; specifically, the transmitter 24a is arranged in the left-hand car door 6, and the transmitter 24b is arranged in the right-hand car door 6. In addition, a further transmitter 24c may be arranged as a third transmitter of the first device 4 in the rear region of the motor vehicle 1. The transmitters 24a, b, c are used particularly for transmitting the wake-up signal 12 and the region delimiting signal 13. Furthermore, the first device 4 contains a further transmitter/receiver 20 which is arranged, for example, on the ignition lock 9. The response signal 14 and the operating signal 15 are transmitted between the transmitter/receiver 20 and the transmitter/receiver 17.

The locking system 3 also has access authorization and/or driving authorization which is explained in more detail below and which can be used as an alternative by the user 2 or else when the keyless entry/go function fails.

Figure 4:
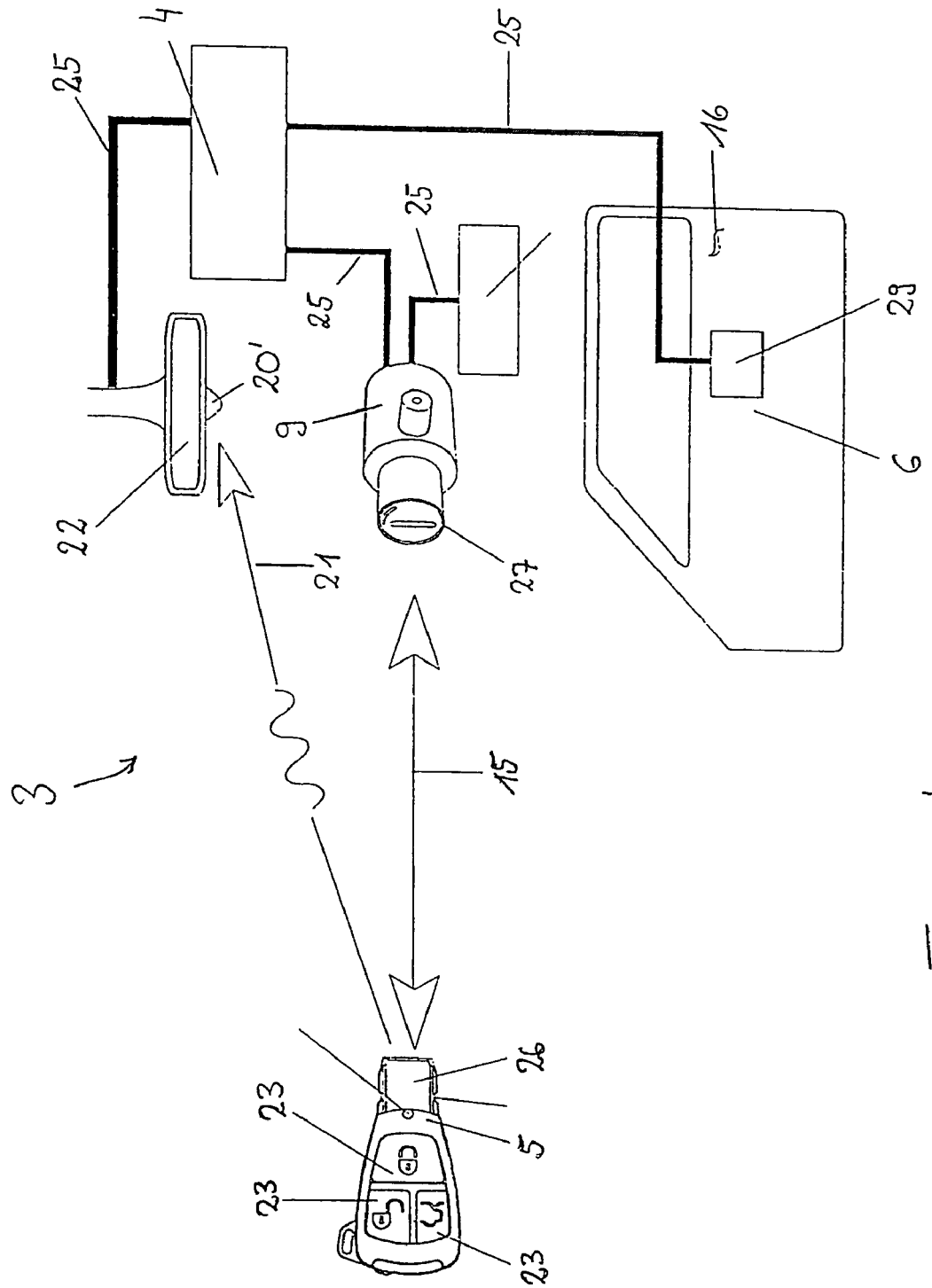
FIG. 4 is a schematic view of the locking system with its operation-dependent functions.

As is apparent from FIG. 4, the locking system 3 for access authorization can also be actuated by remote control using the second device 5 which is embodied in the form of an electronic key. In the present case, the car doors 6 of the motor vehicle 1 can be locked and unlocked by remote control up to a certain maximum distance from the motor vehicle 1. That is, the central locking system for the car doors 6 can thus be activated by the user 2.

For this purpose, a coded remote control signal 21 can be transmitted between the second device 5 and the transmitter/receiver 20 shown in FIG. 2. Of course, a transmitter/receiver 20' can also be arranged centrally at some other location in the motor vehicle 1, for example on the interior rear view mirror 22, as shown in FIG. 4. Electromagnetic signals such as radio frequency signals and/or infrared signals or the like are generally used as remote control signals 21. The transmission of the remote control signals 21 can be triggered by the user 2 by means of activation elements 23 which are located on the housing of the second device 5 and are configured as pushbutton keys.

The transmitted remote control signal 21 is then fed to a first device 4 which is located in the motor vehicle 1, and after its positive evaluation, i.e., if it is the authorized second device 5, a control unit 29 which is located, for example, in the respective car door 6 and which is connected to the first device 4 via a bus system 25 is actuated in order to lock or unlock the car door. 6. In the case of the second device 5 shown in FIG. 4 there are a total of three pushbutton keys 23, more specifically one pushbutton key 23 for unlocking and locking the car door 6 and a further pushbutton key 23 for opening the lid of the trunk.

FIG. 4 also shows the operation-dependent (manually actuated) driving authorization. For this purpose, the second device 5 is inserted with its front part 26 into a receptacle 27 of the disabled electronic ignition lock 9. During the insertion, the second device 5 acts on a switching element, the so-called "key inserted" switch, which is located in the ignition lock 9. As a result, an inductive transmission of energy from the ignition lock 9 to the second device 5 is switched on so that the energy which is necessary for the intended operation of the second device 5 is supplied by the ignition lock 9. The ignition lock 9 then exchanges the coded operating signal 15 with the second device 5 (which is located in the receptacle 27) for example, via infrared signals. After positive evaluation of the transmitted operating signal 15, the enabling process for the ignition lock 3 may be triggered. When the ignition lock 9 is enabled, a further movement of the second device 5 in the ignition lock 9 is then made possible in order to activate the motor vehicle 1.

As has already been described above in more detail, the second device 5 has a standby state in which the operator-independent (automatic) function is at least partially made possible, with a reduced energy requirement. However, in the standby state, a certain degree of partial operability, which consumes energy, of the second device 5 is maintained in order to be able to receive and process the wake-up signal 12.

In order to save energy until the second device 5 is first needed, and thus to prolong the service life of the energy accumulator 28, according to the invention the second device 5 is in a sleep state before its initial activation. An automatic function is not possible in the sleep state, and the second device 5 thus has a significantly reduced energy consumption.

However, in the sleep state of the second device 5, a wake-up signal 12 which has, if appropriate, been emitted by the first device 4 is ineffective. Therefore, so that the automatic function can be activated by the user 2 when necessary, the second device 5 is changed over, during the first operator-dependent authentication (initial authentication), from the sleep state into the standby state in which the operator-independent function is at least partially made possible. As a result, the user 2 can, when necessary, easily activate the automatic function at any time if the second device 5 is still in the sleep state.

In the sleep state, the second device 5 is expediently in a completely switched-off state. At most leakage currents then flow in the transmitter/receiver 17 and the logic circuit 18 of the second device 5 according to FIG. 3, so that the second device 5 essentially consumes no energy. In order to maximize the energy saving, it is also appropriate that the second device 5 be in the sleep state while it is being manufactured, and remain so up to its delivery to the user 2.

As already explained, and as is apparent from FIG. 4, an electronic ignition lock 9 for the manually actuated driving authorization is arranged in the motor vehicle 1. It is appropriate to use the ignition lock 9 in order to permit the user 2 easily to carry out the operator-dependent initial authentication so as to change over the second device 5 from the sleep state into the standby state. For this purpose, the second device 5 is inserted into the receptacle 27 of the ignition lock 9. After the second device 5 has been plugged into the receptacle 27 by its front part 26, inductive transmission of energy from the ignition lock 9 to the second device 5 is switched on. The activated state for the second device 5 is switched on using this energy, the intended operation of the logic circuit 18 and of the transmitter/receiver 17 being assumed for authentication purposes. After the intended operation has been carried out, the second device 5 is returned to the standby state. In the standby state, the wake-up signal 12 can, as already described, be received at any time in order to initiate an intended operation. If the second device 5 has previously not yet been in operation and remains in the sleep state up to that time, the device is thus now activated for the operator-independent function. In the second device 5 there is also a timer 19 (shown in FIG. 3) which can be used, for example, to enable the device 5 only for a certain period of time.

The invention is also comprises all the developments by a person skilled in the art within the scope of the protective claims. Such a locking system can thus be used not only in a motor vehicle. It is also possible to use it for another type of door lock which is located, for example, on a building or the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for automatic access or driving authorization for a motor vehicle, said system comprising:
    a first device in the form of a control device having at least two states for engaging and disengaging one of vehicle door locks, an ignition lock, a steering wheel locking means, a vehicle immobilizer and an engine control unit; and
    a second device in the form of one of an electronic key, an ID transmitter and a chip card; wherein,
    each of first and second devices has means for transmitting and receiving signals, including a coded operating signal for authenticating the second device;
    after a positive evaluation of a coded operating signal, a change in state of the first device can be brought about when the second device is authorized;
    before the second device is first activated, it is initially in a sleep state in which automatic function is not permitted and which has reduced consumption of energy;
    during a first, operator-dependent, authentication, the second device is changed over from the sleep state into a standby state in which an automatic function is at least partially made possible; and
    said first authentication is actuatable after the second device has been inserted into a receptacle of an electronic ignition lock.

2. The locking system as claimed in claim 1, wherein in the sleep state, the second device is in a completely switched-off state, with substantially no consumption of energy.

3. The locking system as claimed in claim 2, wherein the second device is in the sleep state while it is being manufactured, and in when it is being delivered to the user.

4. The locking system as claimed in claim 1, wherein the second device is in the sleep state while it is being manufactured, and in when it is being delivered to the user.

5. A method for operating a vehicle locking system comprising a control device for engaging and disengaging a vehicle system in response to a coded authorization signal from a remote device having means, operable when said remote device is in a standby state, for transmission and reception of said coded authorization signal; said remote device being in an initial sleep state in which energy consumption is substantially reduced and transmission of said coded authorization signal is disabled; said method comprising:

an operator of said vehicle locking system inserting said remote device into a receptacle of a vehicle ignition lock;

said vehicle ignition lock transmitting energy to said remote device inserted into said receptacle; and changing said remote device from said sleep state to said standby state in response to and using said energy transmitted from said vehicle ignition lock.

6. The method according to claim 5, wherein said remote device automatically transmits said coded authentication signal to said control device, without manipulation by said operator, when said remote device is in said standby state.

7. Apparatus for controlling engaging and disengaging of a system on a motor vehicle, comprising:

a control device for engaging and disengaging said vehicle system in response to a coded authorization signal;

a remote device having means, operable when said remote device is in a standby state, for transmitting said coded authorization signal, said remote device being in an initial sleep state, in which energy consumption is substantially reduced relative to said standby state, and in which transmitting of said coded signal is disabled; and means, operable upon insertion of said remote device into a receptacle of a vehicle ignition lock, for changing said remote device from said initial sleep state to said standby state.

8. The apparatus according to claim 7, wherein said remote device automatically transmits said coded authentication signal to said control device, without manipulation by said operator, when said remote device is in said standby state.

* * * * *